G. V. MATHIAS.
CHAIN COUPLING.
APPLICATION FILED APR. 30, 1919.
1,337,846.
Patented Apr. 20, 1920.
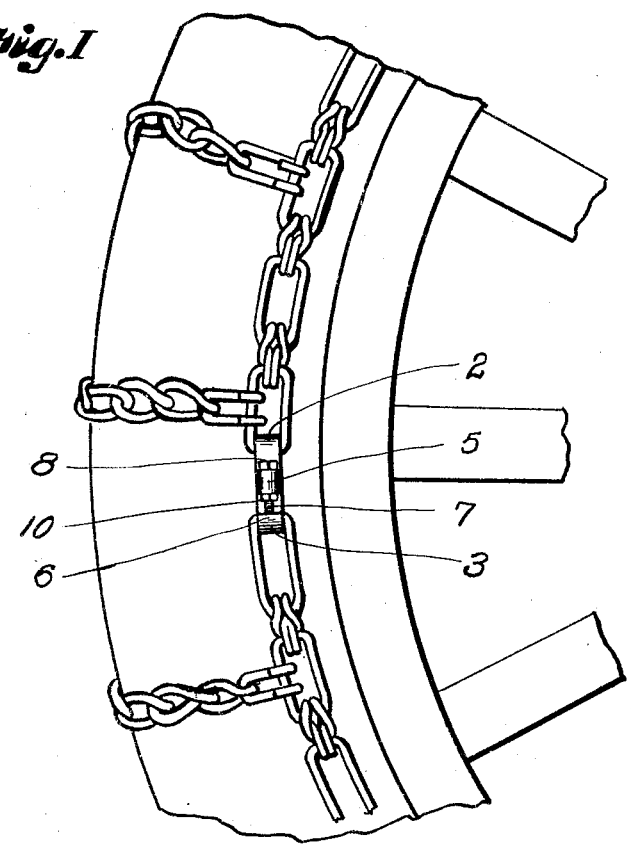
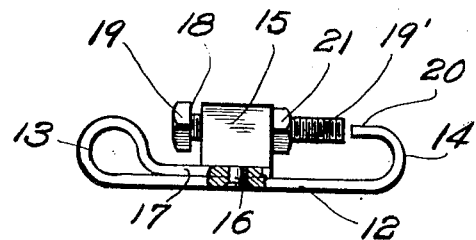
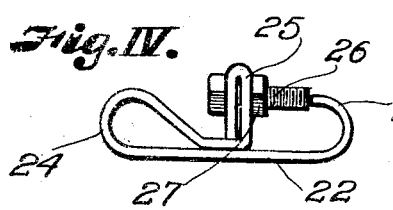
Inventor
George V. Mathias.
By Arthur C. Brown
Attorney

UNITED STATES PATENT OFFICE.

GEORGE V. MATHIAS, OF HUMBOLDT, KANSAS.

CHAIN-COUPLING.

1,337,846.                Specification of Letters Patent.    Patented Apr. 20, 1920.

Application filed April 30, 1919. Serial No. 293,873.

*To all whom it may concern:*

Be it known that I, GEORGE V. MATHIAS, a citizen of the United States, residing at Humboldt, in the county of Allen and State of Kansas, have invented certain new and useful Improvements in Chain-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to chain connectors and one of the objects thereof is to provide an inexpensive, durable and efficient means for connecting the loose ends of an antiskid chain; for example, such as is used on motor vehicle wheels.

In the drawings,

Figure I is a view of a wheel provided with a chain equipped with my invention.

Fig. II is a detail perspective view of one form of my invention.

Fig. III is a side view of a modified form of the same, and

Fig. IV is a further modified construction of the device.

Referring now to Fig. II:

The connector consists of a strip bent to provide a bar 1 having a closed loop 2 at one end and a hook 3 at the other. In forming the loop 2, the strip is bent down upon the bar 1 as at 4 and then outwardly therefrom and coiled upon itself at right angles to provide a screw-supporting bearing 5 in the form of a barrel in line with the free end 6 of the hook 3. The bearing 5 may or may not be threaded to receive a longitudinally adjustable bridge member, shown as a screw 7 having on one end a head 8 and provided with a projecting end 9 in line with the end 6 of the hook 3, the projecting portion 9 carrying a jam nut 10. The closed loop 2 will be engaged by a link which may be attached to it by spreading the link and then closing the same. The hook 3 is adapted to engage one of the links of the chain by loosening the jam nut 10 and retracting the screw 7 whereby the link may be received within the open loop formed by the bar 1 and the hook 3. The screw 7 may then be adjusted longitudinally so that its end 11 will engage the end 6 of the hook whereupon the jam nut 10 may be caused to bind against the end of the supporting barrel 5 to prevent longitudinal movement of said screw so as to lock the two links together.

In the form shown in Fig. III the strip is bent to provide a bar 12 with a closed loop 13 at one end and a hook 14 at the other. The end which forms the loop 13 is bent flat upon the bar 12 and carries a screw-supporting block 15 having a rivet 16 which may pass through the end 17 and through the bar 12 to secure the parts in place. The screw 18 is provided with a head 19 and passes through the block 15 so that its end 19', which may aline with the free end 20 of the hook 14, may bridge the gap between the supporting block 15 and the end 20 of the hook. The screw 18 is also provided with a jam nut 21 which is adapted to bind against the end of the block 15 to hold the screw against turning when it is in its locked position.

Referring to Fig. IV, the strip 22 is bent at one end to provide a hook 23 and at the other end to form a closed loop 24 with an upstanding rearwardly bent end 25 which constitutes a bearing or carrier for the screw 26, which is adapted to be held in its adjusted position by the jam nut 27, the generic features of this form of the device, however, being substantially the same as the form shown in Figs. I, II and III.

In order to detach the chain from the wheel, it will be only necessary to release the jam nut and then retract the screw so that the engaged link may be freed from the open loop formed by the bar and the hook.

For the purpose of illustration, I have shown three forms of my device which admirably serve the purpose for which the invention is intended but it is obvious that the device may partake of other forms and I, therefore, do not wish to be limited to the exact details of the construction shown but reserve the right to make such changes and alterations as properly come within the scope of the appended claims.

What I claim and desire to secure by Letters-Patent is:

1. A chain connector comprising a body having a hooked end, a longitudinally movable element carried by the body portion to engage the hooked end, and an independently movable locking device for maintaining the movable body against movement.

2. A chain connector consisting of a flexible strip bent upon itself to form a closed loop and an open loop, having an inturned portion, and a longitudinally movable member carried by the strip and having movement to bridge the gap between the inturned portion and the main portion of the strip.

3. A chain connector consisting of a flexible strip bent upon itself to form a bar having a closed loop at one end and a hook at the other, an outstanding portion having a screw support in line with the free end of the hook and spaced therefrom, and a screw adjustably carried by the support.

4. A chain connector consisting of a flexible strip bent upon itself to form a bar having a closed loop at one end and a hook at the other, and having a screw support extending integrally from the closed loop portion and spaced from but in line with the free end of the hook, a screw longitudinally adjustable in the support toward and away from the end of the hook, and a set nut on the screw to lock it rigid with the support when the screw and the end of the hook abut.

5. A chain connector comprising a flexible strip bent upon itself to provide a bar having a loop at one end and a hook at the other, the strip being bent outwardly away from the bar and curved to form a screw supporting barrel, a screw in the barrel in line with the end of the hook, and a jam nut on the screw.

In testimony whereof I affix my signature.

GEORGE V. MATHIAS.